United States Patent

[11] 3,596,073

[72] Inventors Akira Yokoyama;
Toshio Imai, both of Kawasaki-shi,
Kanagawa-ken, Japan
[21] Appl. No. 746,378
[22] Filed July 22, 1968
[45] Patented July 27, 1971
[73] Assignee The General Corp.
Kanagawa-ken, Japan
[32] Priority July 22, 1967
[33] Japan
[31] 42-46897

[54] CONTROL SEQUENCE NECESSARY TO IMPLEMENT A GIVEN OPERATION
9 Claims, 6 Drawing Figs.

[52] U.S. Cl. ....... 235/156, 235/168
[51] Int. Cl. ....... G06f 7/385
[50] Field of Search ....... 235/156, 168

[56] References Cited

OTHER REFERENCES

Thomas C. Bartec Digital Computer Fundamentals 1966, pp. 223—224 & 320—323 & 326— 349

*Primary Examiner*—Malcolm A. Morrison
*Assistant Examiner*—David H. Malzahn
*Attorney*—Ernest G. Montague

ABSTRACT: A control sequence method for implementing an arithmetic operation of some fundamental operations performed by repeating and/or combining some or all of the steps of elementary operations.

Interchange method

Interchange method

Force-out method

Inventors:
Akira Yokoyama
Toshio Imai
By Ernest Montague
attorney

FIG. 2(a)

Interchange method

| | | content of WA2 | content of WA1 | content of registerA | content of registerE | register driving | N.D.A. (E→A) | S.A. (E→A) | N.D.T. (E→A) | S.T. (E→A) | O.A. (A→E) | Shift |
|---|---|---|---|---|---|---|---|---|---|---|---|---|
| | initial state | o | o | a | b | | | | | | | |
| 1 | Ist reading out step | o | a | o | b | $Z_A$ | | | | | | |
| 2 | Ist shift step | a | o | o | b | $Z_E$ | | | | | | inhibition |
| 3 | 2nd reading out step | a | b | o | o | $Z_E$ | | | | | | |
| 4 | addition step | a+b | b | o | o | $Z_E$ | | | | | | inhibition |
| 5 | Ist writ ing in step | a+b | b | o | b | $Z_E$ | | inhibition | | inhibition | | inhibition |
| 6 | 2nd shift step | b | a+b | o | b | $Z_A$ | | | inhibition | inhibition | inhibition | |
| 7 | 2nd writ ing in step | b | a+b | a+b | b | $Z_A$ | | | | | | |
| 8 | clear step | o | o | a+b | b | $Z_A$ | | | | | | |

Register driving is not changed

Inventors Akira Yokoyama Toshio Imai
By Ernest G. Montague
Attorney

FIG. 2(b)

Force—out mothod

| | | content of $WA_2$ | content of $WA_1$ | content of registerA | content of registerE | register driving | N.D.A. (E→A) | S.A. (E→A) | N.D.T. (E→A) | S.T. (E→A) | O.A. (A→E) | shift |
|---|---|---|---|---|---|---|---|---|---|---|---|---|
| | initial state | o | o | a | b | | | | | | | |
| 1 | 1st reading out step | o | b | a | o | $Z_E$ | | | | | | inhibition |
| 2 | 1st shift step | b | o | a | o | $Z_A$ | | | | | | |
| 3 | 2nd reading out step | b | a | o | o | $Z_A$ | | | | | | |
| 4 | addition step | b | a+b | o | o | $Z_E$ | | | | | inhibition | inhibition |
| 5 | 1st writ ing in step | b | a+b | o | b | $Z_E$ | | inhibition | | inhibition | inhibition | inhibition |
| 6 | 2nd shift step | a+b | o | o | b | $Z_A$ | | | inhibition | inhibition | | inhibition |
| 7 | 2nd writ ing in step | a+b | o | a+b | b | $Z_A$ | | | | | | |
| 8 | clear step | o | o | a+b | b | $Z_E$ | | | | | | |

Register driving is not changed

Inventors:
Akira Yokoyama
By
attorney

Inventors:
Akira Yokoyama
Toshio Suda
By [signature]
attorney

INVENTORS
Akira Yokoyama
Toshio Imai
BY Ernest G. Montague
Attorney

CONTROL SEQUENCE NECESSARY TO IMPLEMENT A GIVEN OPERATION

The present invention relates to a method of operation between numerals stored in magnetic core registers.

There are many kinds of arithmetic operations, for instance, addition, subtraction, multiplication, division and evolution (to extract the square root of a number). But it is a well-known fact that subtraction is substituted by addition of complements and that multiplication or division is substituted by repeating addition or subtraction and addition of ±1, and that evolution is substituted by repeating subtraction and by combining addition of +2 and +1. In practical operation, moreover, there is required a transfer operation which is the action of the locomotion of numerals between the registers at the beginning, at the end, or during the whole operation. Also, there is required a shift operation which is the action of the locomotion of numerals between units in a register.

Such operations are considered combinations of some of the following fundamental operations. For instance, if the content of a register $A$ is $a$ and the content of a register $E$ is $b$, namely $A \equiv a$ and $E \equiv b$, the fundamental operations are a. Nondestructive addition (N.D.A.).

N.D.A. $(E \rightarrow A)$ means that the content of the register $A$ becomes $a+b$ and the content of the register $E$ stays $b$, namely $A \equiv a+b$ and $E \equiv b$.

b. Simple addition (S.A.).

S.A. $(E \rightarrow A)$ means that the content of the register $A$ becomes $a+b$ and the content of the register $E$ becomes $0$, namely $A \equiv a+b$ and $E \equiv 0$.

c. Nondestructive transfer (N.D.T.).

N.D.T. $(E \rightarrow A)$ means that the content of the register $A$ becomes $b$ and the content of the register $E$ stays $b$, namely $A \equiv b$ and $E \equiv b$.

d. Simple transfer (S.T.).

S.T. $(E \rightarrow A)$ means that the content of the register $A$ becomes $b$ and the content of the register $E$ becomes $0$, namely $A \equiv b$ and $E \equiv 0$.

e. $0$-addition (O.A.) or Clear (C1.).

O.A. $(A \rightarrow E)$ means that the content of the register $A$ becomes $0$ and the content of the register $E$ stays $b$, namely $A \equiv 0$ and $E \equiv b$. C1. $(A)$ means that the content of the register $A$ becomes $0$, namely $A \equiv 0$.

f. Unit-shift (U.S.).

U.S. $(A)$ means that the content of the register $A$ becomes $a \times 10$, namely $A \equiv a \times 10$.

The magnetic core register can be used with difficulty as an accumulator. So, in operation, practically the content of one unit of each register A and E are read on two accumulatable working registers $WA_1$ and $WA_2$ having one unit in each, and operation is performed between the two working registers. The results of this operation are written into the original registers. All operations cannot be performed at one time, but they need several steps consisting of elementary operations. If the function of the steps is suitably selected, all of the fundamental operations can be performed by inhibiting certain steps.

It is one object of the present invention to provide a method of fixing such function of steps of elementary operations, and to select some of them.

It is another object of the present invention to provide a method which completely performs available arithmetic operations by a very simple control.

With these objects in view which will become apparent in the following detailed description, the present invention will be clearly understood in connection with the accompanying drawings, in which:

FIG. 1($b$) is a block diagram of a "force-out method";

FIG. 2($a$) is a table of the "interchange method" and of selecting steps of the operation;

FIG. 2($b$) is a table of a "force-out method" and of selecting steps thereof;

Figures 1A, 1B:
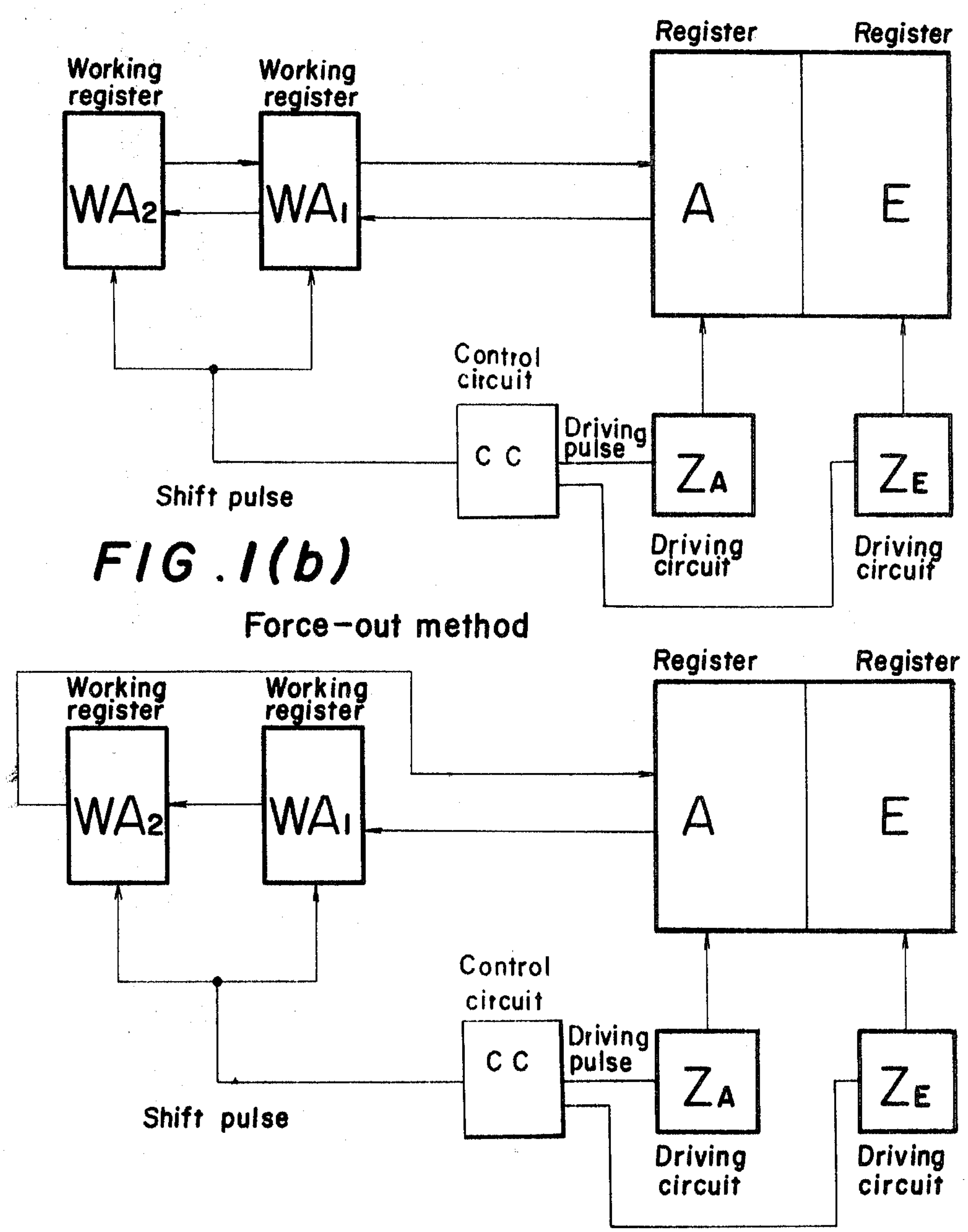
FIG. 1($a$) is a block diagram of an "interchange method" example of the present invention.
Figure 3:
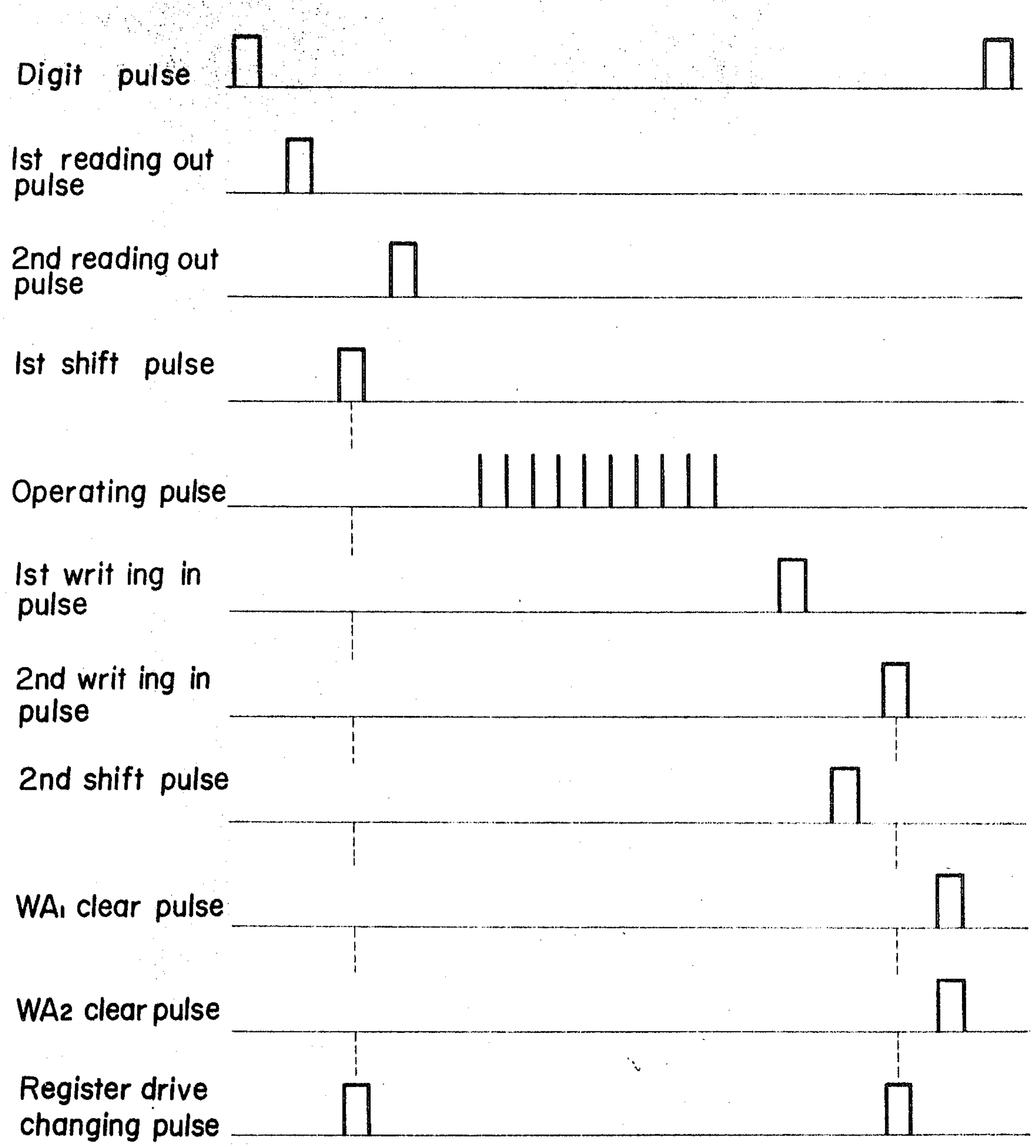
FIG. 3 shows pulse series of the "interchange method"

Referring now to the drawings, and particularly to FIGS. 1($a$) and 1($b$), both methods comprise eight steps each. In the "interchange method," actions of readout and write-in are performed to or from only working register $WA_1$, and a shift operation is a round shift, that is, an interchanging of the contents between the working registers $WA_1$ and $WA_2$. On the other hand, in the "force-out method," the readout is performed to the working register $WA_1$ and the write-in is performed from the working register $WA_2$, and the shift operation is a one-directional shift, that is, the content of the working register $WA_2$ is extinguished, and the content of the working register $WA_1$ is removed to the working register $WA_2$.

The "interchange method" is performed with the following steps:

1. The first readout step.

The content of the fixed unit of the register A is read out and is removed into the working register $WA_1$.

2. The first shift step.

The contents of the working registers $WA_1$ and $WA_2$ are interchanged.

3. The second readout step.

The content of the fixed unit of the register E is read out and is removed to the working register $WA_1$.

4. The addition step.

The content of the working register $WA_1$ is added to the content of the working register $WA_2$.

(Here, the content of the working register $WA_1$ is not destroyed.)

5. The first write-in step.

The content of the working register $WA_1$ is written into the original unit of the register E.

6. The second shift step.

The contents of the working registers $WA_1$ and $WA_2$ are interchanged.

7. The second write-in step.

The content of the working register $WA_1$ is written into the original unit of the register A.

8. The clear step.

The working registers $WA_1$ and/or $WA_2$ are cleared.

To perform the above mentioned actions, the register drive circuit $Z_A$ is acted on at the steps (1) and (7), and the register drive circuit $Z_E$ at the steps (3) and (5). Therefore, changing the function of action of register drive circuit $Z_A$ or $Z_E$ is necessary at the steps (2) and (6) in parallel.

If there is no changing action, the register A or E is always fixed.

On the other hand, the "force-out method" is performed by the following steps:

1'. The first readout step.

The content of the fixed unit of the register E is read out and is removed into the working register $WA_1$.

2'. The first shift step.

The content of the working register $WA_1$ is removed to the working register $WA_2$.

(Here, the content of the working register $WA_1$ becomes 0.)

3'. The second readout step.

The content of the fixed unit of the register A is read out and is removed to the working register $WA_1$.

4'. The addition step.

The content of the working register $WA_2$ is added to the content of the working register $WA_1$.

(Here, the content of the working register $WA_2$ is not destroyed.)

5'. The first write-in step.

The content of the working register $WA_2$ is written into the original unit of the register E.

6'. The second shift step.

The content of the working register $WA_1$ is removed to the working register $WA_2$.

7'. The second write-in step.

The content of the working register $WA_2$ is written into the original unit of the register A.

8'. The clear step.

The working registers $WA_1$ and/or $WA_2$ are cleared.

To perform the above-mentioned actions, the changing function of actions of the register drive circuits $Z_A$ and $Z_E$ is necessary at the steps (2'), (4'), (6'), and (8') unlike the former case.

The fundamental operation which comprises all of the eight steps in the above-described two methods, is N.D.A. Other fundamental operations can be performed by inhibiting some of these steps. Steps are inhibited in the above-described two methods, that is, fixing the inhibition, as shown, for example, in FIGS. 2(*a*) and 2(*b*).

Refer.ing now to FIG. 2(*a*) for an example of the "interchange method," on the line of S.T., the first write-in step is inhibited, so that the content of the register E remains 0. The second shift step is inhibited so that the content of the working register $WA_1$ still remains *b*. Then *b* is written into the register A next by the second write-in step. Then, the content of the register A becomes *b* and the content of the register E becomes 0. This is an operation of Simple Transfer. Other fundamental operations can be accomplished in accordance with the present invention as well as the above consideration.

Figure 4:
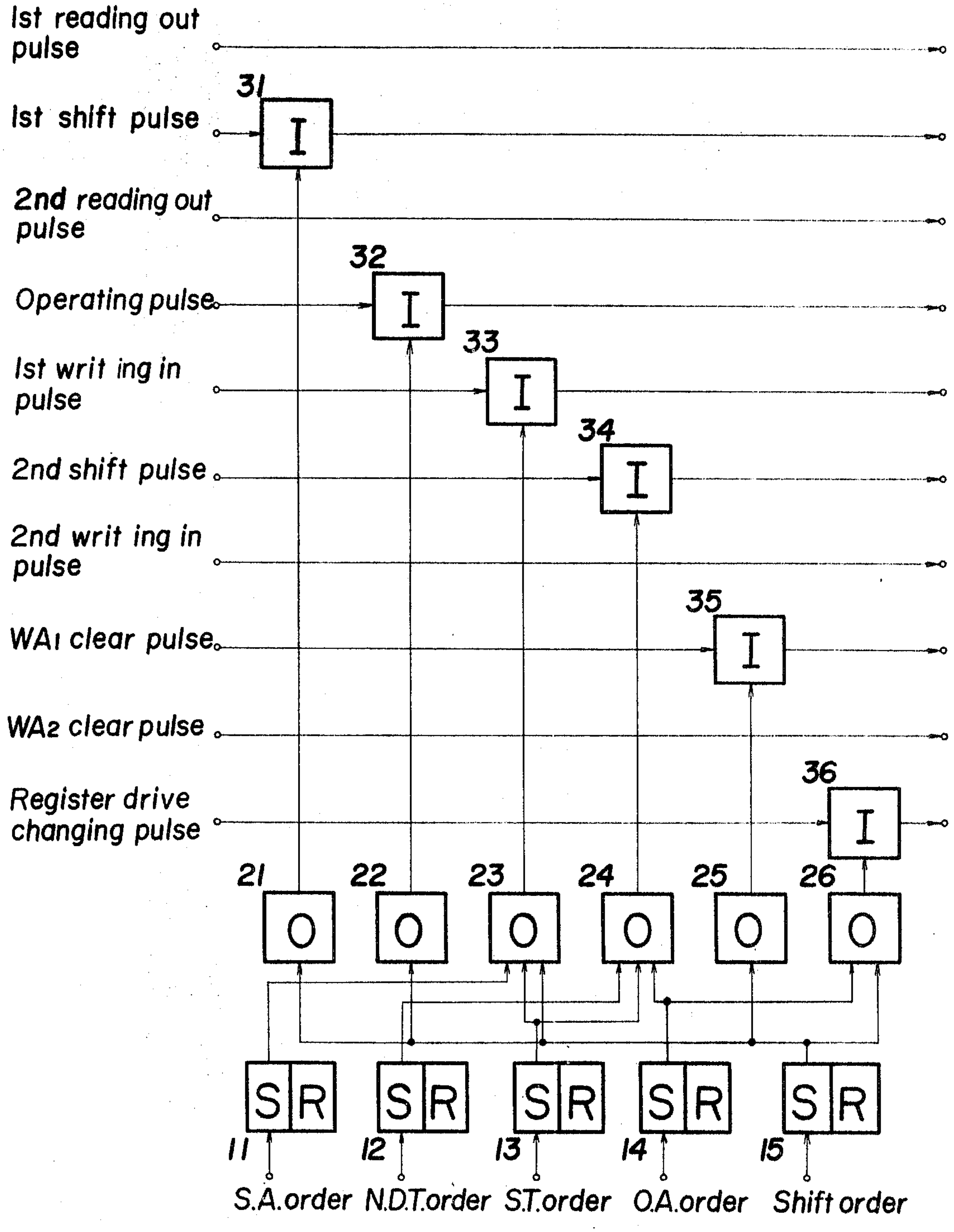
FIG. 4 shows a circuit diagram of the "interchange method."

Referring now again to the drawings, and more particularly to FIG. 4 there is shown an example of a circuit diagram of the "interchange method." For instance, it is requested that the content of the register A becomes $a+b$ and that the content of the register E becomes 0, when the content of the register A is *a* and the content of the register E is *b*. The operation of S.A. $\underline{E \rightarrow A}$ is sufficient. Therefore, it becomes sufficient that a flip-flop circuit 11 should be set in FIG. 4. The reset of the flip-flop circuits is omitted in the figure, but they are accomplished by a signal at the end of the operation.

The present invention is efficient and appropriate for arithmetic operation using magnetic core registers. Of course, the present invention is sufficient for any destructive readout-type registers.

We claim:

1. A method of arithmetic operation performed on a small scale machine such as a desk calculator and executed by two numerals in two fixed registers comprising magnetic core matrices, in whole the contents of corresponding units of said two fixed registers are transferred into two single unit working registers and performing adding or subtraction operations between said two working registers, and writing the results of said operations into the original units of said two fixed registers, comprising the steps performing elementary operations of
   reading out the content of one unit of one of said two fixed registers on one of said two working registers, constituting a first readout step,
   shifting the contents of said two working registers, constituting a first shift step,
   reading out the content of one unit of the other of said two fixed registers on said one of said two working registers, constituting a second readout step,
   adding the content of said one of said two working registers to the other of said two working registers, constituting an addition step,
   writing the content of said one of said two working registers into the original unit of the other of said two fixed registers, constituting a first write-in step,
   shifting the contents of said two working registers, constituting a second shift step,
   writing the content of said one of said two working registers into the original unit of said one of said two fixed registers, constituting a second write-in step, and
   clearing at least one of said two working registers, constituting a clear step.

2. The method, as set forth in claim 1, wherein
   a fundamental operation of nondestructive addition of the numerals stored in said two fixed registers is performed by executing said eight steps sequentially.

3. The method, as set forth in claim 1, wherein
   a fundamental operation of simple addition of the numerals stored in said two fixed registers is performed by executing said eight steps sequentially but inhibiting said first write-in step.

4. The method, as set forth in claim 1, wherein
   a fundamental operation of nondestructive transfer and 0 addition and clear, selectively, of the numerals stored in said two fixed registers is performed by executing said eight steps sequentially but inhibiting said second shift step.

5. The method, as set forth in claim 1, wherein
   a fundamental operation of simple transfer of the numerals stored in said two fixed registers is performed by executing said eight steps sequentially but inhibiting said first write-in step and said second shift step.

6. The method, as set forth in claim 1, wherein
   a fundamental operation of 0 addition and clear, selectively, of the numerals stored in said two fixed registers is performed by executing said eight steps sequentially but inhibiting said addition step and said first write-in step.

7. The method, as set forth in claim 1, wherein
   a fundamental operation of unit shift of the numerals stored in said two fixed registers is performed by executing said eight steps sequentially, but inhibiting said first shift step, said addition step and said first write-in step.

8. The method, as set forth in claim 1, wherein
   a fundamental operation of unit shift of the numerals stored in said two fixed registers is performed by executing said eight steps sequentially, but inhibiting said first readout step, said addition step, said first write-in step and said second shift step.

9. A method of arithmetic operation performed on a small scale machine such as a desk calculator and executed by two numerals in two fixed registers comprising magnetic core matrices, in which the contents of corresponding units of said two fixed registers are transferred into two single unit working registers, and performing adding or subtraction operations between said two working registers, and writing the results of said operations into the original units of said two fixed registers, comprising the steps performing elementary operations of
   reading out the content of one unit of one of said two fixed registers on one of said two working registers, constituting a first readout step,
   shifting the contents of said two working registers, constituting a first shift step,
   reading out the content of one unit of the other of said two fixed registers on said one of said two working registers, constituting a second readout step,
   adding the content of the other of said two working registers to said one of said two working registers, constituting an addition step,
   writing the content of the other of said two working registers into the original unit of said one of said two fixed registers, constituting a first write-in step,
   shifting the contents of said two working registers, constituting a second shift step,
   writing the content of said other of said two working registers into the original unit of said other of said two fixed registers, constituting a second write-in step, and
   clearing at least one of said two working registers, constituting a clear step.